United States Patent [19]
Hashimoto et al.

[11] Patent Number: 5,157,505
[45] Date of Patent: Oct. 20, 1992

[54] APPARATUS FOR AND METHOD OF IMAGE RECORDING AND READING, APPARATUS FOR AND METHOD OF IMAGE RECORDING, AND APPARATUS FOR AND METHOD OF IMAGE READING

[75] Inventors: Yasuhiro Hashimoto, Tokyo; Koji Tagusari, Ibaraki; Hideki Tanaka, Tsuchiura; Katsubumi Ouchi, Chigasaki, all of Japan

[73] Assignee: Hitachi, Ltd., Tokyo, Japan

[21] Appl. No.: 464,197

[22] Filed: Jan. 12, 1990

[30] Foreign Application Priority Data

Jan. 25, 1989 [JP] Japan .................................. 1-13946

[51] Int. Cl.⁵ .................. H04N 1/23; H04N 1/32; H04N 1/36; G01D 15/26
[52] U.S. Cl. ........................... 358/296; 358/412; 358/496; 358/498; 346/134
[58] Field of Search ............ 358/412, 413, 422, 486, 358/492, 496, 497, 498, 296; 400/232, 236; 346/134, 138; 355/317

[56] References Cited

U.S. PATENT DOCUMENTS

| | | | |
|---|---|---|---|
| 4,260,241 | 4/1981 | Honma et al. ................. | 355/14 R |
| 4,426,653 | 1/1984 | Komada ........................ | 358/486 X |
| 4,475,829 | 10/1984 | Goff, Jr. et al. ............. | 400/232 |
| 4,748,516 | 5/1988 | Harano et al. ................ | 358/296 |
| 4,827,355 | 5/1989 | Kotani et al. ................. | 358/296 |
| 4,839,737 | 6/1989 | Saito ............................ | 358/296 X |
| 4,887,101 | 12/1989 | Hirose et al. ................. | 346/134 |
| 4,893,150 | 1/1990 | Yamada ........................ | 355/317 |
| 4,926,270 | 5/1990 | Sakamoto ..................... | 358/496 X |
| 4,953,037 | 8/1990 | Ito et al. ....................... | 358/498 X |
| 4,954,910 | 9/1990 | Ueno ............................ | 358/296 |
| 4,956,651 | 9/1990 | Emori ........................... | 346/134 X |
| 4,969,761 | 11/1990 | Gibson-Saxty ................ | 400/232 X |
| 4,970,531 | 11/1990 | Shimizu et al. ............... | 346/76 PH |

Primary Examiner—Joseph W. Hartary
Assistant Examiner—Eric Frahm
Attorney, Agent, or Firm—Antonelli, Terry, Stout & Kraus

[57] ABSTRACT

In a technique in which a thermosensitive recording paper and a recording head are arranged in contact with each other and a voltage is applied to the recording head in accordance with an image to be recorded while the recording paper being transferred by a motor, striped lines, so-called blanks, where no image is recorded, appear because of a delay on starting the motor. The present invention solves this problem by delaying the timing of the image recording by the amount of the delay in starting the motor.

5 Claims, 10 Drawing Sheets

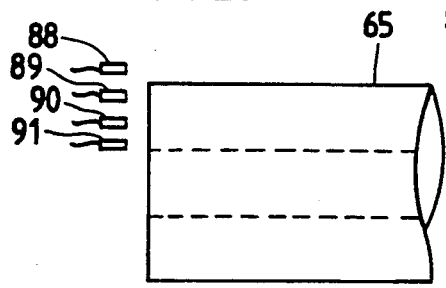
FIG. 9
FIG. 10
| SPEED $N_T$ \ RADIUS R | $R_1$ | $R_2$ | $R_3$ | $R_4$ | --- |
|---|---|---|---|---|---|
| $N_{T1}$ | $T_{d11}$ | $T_{d12}$ | $T_{d13}$ | $T_{d14}$ | --- |
| $N_{T2}$ | $T_{d21}$ | $T_{d22}$ | $T_{d23}$ | $T_{d24}$ | --- |
| $N_{T3}$ | $T_{d31}$ | $T_{d32}$ | $T_{d33}$ | $T_{d34}$ | --- |
| $N_{T4}$ | $T_{d41}$ | $T_{d42}$ | $T_{d43}$ | $T_{d44}$ | --- |
| $N_{T5}$ | $T_{d51}$ | $T_{d52}$ | $T_{d53}$ | $T_{d54}$ | --- |
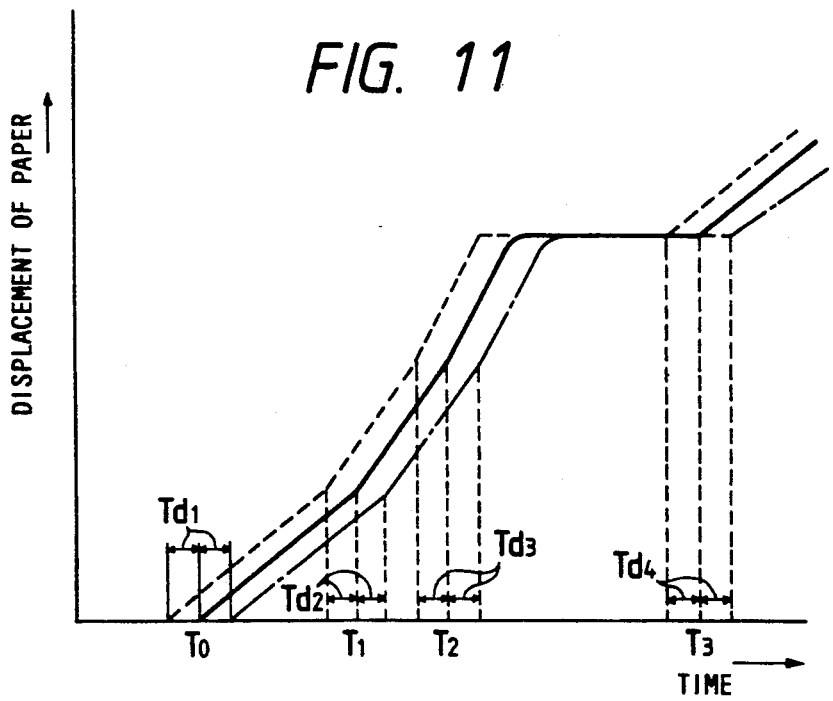
FIG. 11

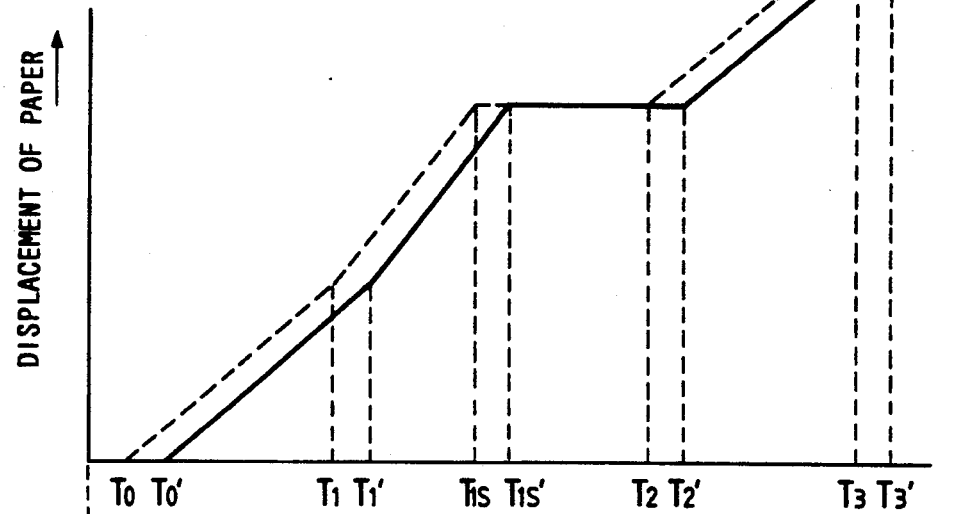
FIG. 12a
FIG. 12b
FIG. 12c
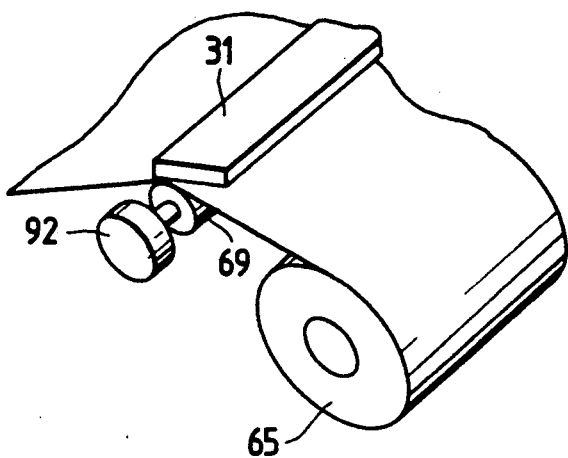
FIG. 13

APPARATUS FOR AND METHOD OF IMAGE RECORDING AND READING, APPARATUS FOR AND METHOD OF IMAGE RECORDING, AND APPARATUS FOR AND METHOD OF IMAGE READING

BACKGROUND OF THE INVENTION

The present invention relates to an apparatus for and method of image recording and reading, an apparatus for and method of image recording, and an apparatus for and method of image reading, such as a facsimile apparatus.

It is well known that a facsimile apparatus has a function of image recording to record an image in accordance with image data received from another apparatus through a transmission line, a function of image reading to read an image recorded from an original in order to transmit image data to another apparatus, a function of network controlling to receive and transmit information through a transmission line, and a function of modulation and demodulation to modulate information into image data and demodulate image data into information. The image recording is usually carried out by a recording head on recording paper transferred directly by a motor or indirectly through a transmission mechanism. Also, the image reading is carried out by a reading sensor to read an image while the original is being transferred using a motor.

Conventionally, the image recording by an apparatus of this type is controlled by matching the output timing of a driving signal for a motor for the transfer of a recording paper with that of a driving signal for recording which is supplied to a recording head in accordance with the image data. However, in the case of such a controlling operation, a problem that recording is started at a position ahead of the proper position where the recording should actually be made arises because of influences caused by delays in starting the motor and in the transmission system and elsewhere in the apparatus. Particularly, in the case of a solid recording, a striped pattern having dark and light lines is recorded in the direction of the main scanning (the transverse direction transverse to the direction of movement of a recording paper), and in some cases, white striped lines (linear blanks) appear. This kind of problem also occurs in image reading. In other words, when an image recorded on an original is read, a different image from the actual one is read because of influences caused by delays on starting a motor for the transfer of the original and in the transmission system and elsewhere in the apparatus.

In connection with the above-mentioned problem, it has been known to prevent the occurrence of blanks in facsimile apparatus, particularly, one using a method of thermal image recording. In Japanese Laid-Open Patent No. 39272/1988, a technique to record the same data twice at the same position at the time of receiving the data is disclosed as a method to prevent the above-mentioned blank spaces.

This disclosed technique to prevent the above-mentioned blank spaces utilizes the expansion of the area of each dot resulting from the recording of the same data twice by the thermosensitive head at the same position. Therefore, a difference between the position at which a recording should be made and the position at which it is actually made still exists because of delays in starting the motor and others, and a striped pattern of dark and light lines tends to occur when a solid recording or the like is carried out. Furthermore, since the same recording is repeated, the required time for recording becomes twice as long, which still presents a problem to be solved for the achievement of high speed recording.

In the Japanese Laid-Open Patent mentioned above, no disclosure is made at all as to the resolution of drawbacks existing in the image reading.

SUMMARY OF THE INVENTION

The object of the present invention is to provide an apparatus for or method of image recording and reading, an apparatus for and method of image recording, and an apparatus for and method of image reading, each capable of diminishing drawbacks in image recording and reading caused by delays in transferring a recording paper, or an original when a motor is started.

Also, the object of the present invention is to provide an apparatus for or method of image recording and reading, an apparatus for and method of image recording, and an apparatus for and method of image reading, each capable of carrying out a high-quality image recording and a remarkably accurate image reading with ease and reliability.

The apparatus for image recording and reading of the present invention is characterized in that it has a network controller to receive information from and transmit information to the outside, a modem to demodulate information received through said network controller or modulate information for transmission, a processor to drive a receiving mechanism in accordance with image data demodulated by said modem in the case of receiving, and to drive a transmission mechanism to transmit the image data read to said modem in the case of transmission, said receiving mechanism containing a first carrier member to transfer a ecording material by a driving signal from said processor and a recording circuit to carry out an image recording, said transmission mechanism containing a second carrier member to transfer an original by a driving signal from said processor and a reading circuit to carry out an image reading, and in that said processor controls the output of a driving signal to said recording circuit in such a manner that it is issued after a given period of time subsequent to the output of a driving signal to said first carrier when said receiving mechanism is driven, and that said reading circuit is driven to read image data after a given period of time subsequent to the output of a driving signal to said second carrier when said transmission mechanism is driven.

Furthermore, a method of image recording of the present invention is characterized in that a recording paper and a recording head are arranged in contact with or closely spaced with respect to each other, and said recording paper and recording head are relatively transferred by a motor, and in that said recording head is driven to carry out an image recording on said recording paper, and the output of a driving signal to said recording head is issued later than that of a driving signal to said motor by a given period of a time determined in accordance with a delay time on starting said motor.

Also, an apparatus for image recording of the present invention is characterized in that it has a motor to transfer a recording paper, a power transmission system to transmit the driving power for said motor in order to convey said recording paper, a recording head to carry out an image recording on said recording paper, controlling means to output a driving signal in order to record said image on said recording head and output a driving signal to drive said motor, and in that said controlling means issues the output signal to drive said recording head for said recording with a delay between the timing of an output signal to drive said motor and the starting of actual transfer of said recording paper.

Furthermore, an apparatus for image reading of the present invention is characterized in that it has a motor to transfer a manuscript, a power transmission system to transmit the driving power of said motor in order to transfer said recording paper, a reading sensor to read said manuscript, and a controlling means to process information read by said reading sensor and to drive said motor, and in that said controlling means starts reading said information with a given period of delay determined in accordance with a period of time between the output signal to drive said motor and the actuation of the actual transfer of said manuscript.

Other objects and features of the present invention will become apparent in the following description.

BRIEF DESCRIPTION OF THE DRAWINGS

FIG. 10 is a diagram showing a part of a table in another embodiment of the present invention, FIGS. 11, 12a, 12b, 12c, 14a, and 14b are diagrams illustrating the movement of paper in another embodiment of the present invention, FIGS. 13 and 15 are partially perspective views of the recording members.

DETAILED DESCRIPTION OF PREFERRED EMBODIMENTS

The present invention will be described in detail in accordance with specific embodiments.

FIGS. 1 to 5 illustrate an embodiment wherein the present invention is applied to the driving control of a facsimile apparatus.

Figure 1:
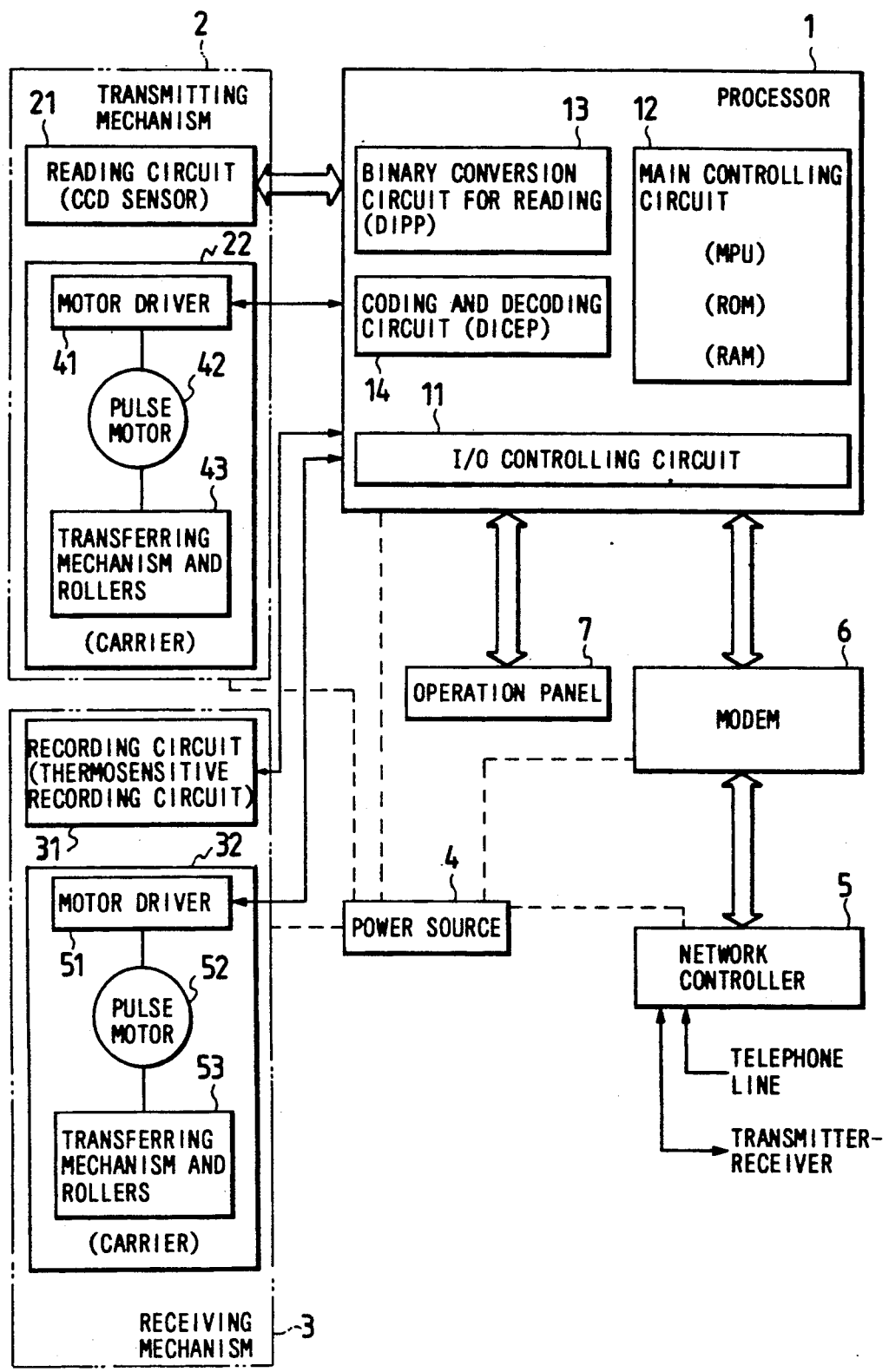
FIG. 1 is a block diagram of an embodiment according to the present invention.
Figure 2:
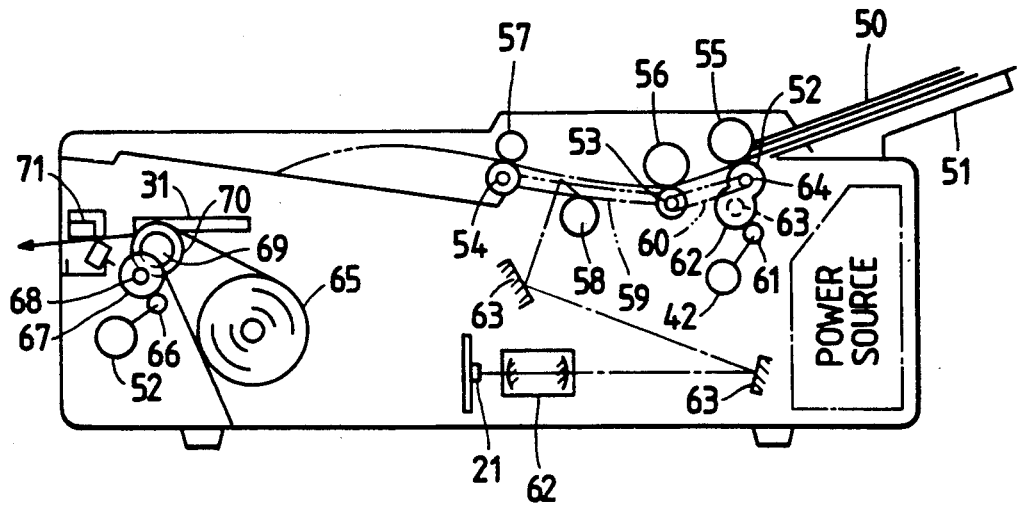
FIG. 2 is a sectional view of the mechanical unit of the embodiment shown in FIG. 1.
Figure 3:
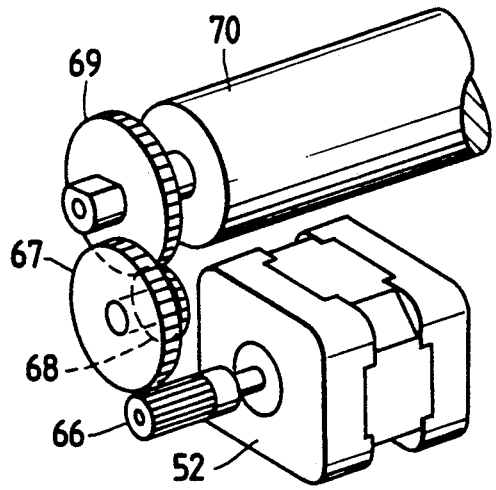
FIG. 3 is a partially perspective view of the mechanical unit shown in FIG. 2.

First, the structure and fundamental movement of the facsimile apparatus will be described with reference to FIGS. 1 to 3. FIG. 1 is a schematic block diagram of a facsimile apparatus, FIG. 2 is a schematic cross section entirely showing the mechanical unit of the facsimile apparatus, and FIG. 3 is an illustration showing a driving force transmission mechanism to transfer the driving force for a pulse motor in a receiving mechanical unit.

Now, the functions of a facsimile apparatus are briefly divided into two groups; one is to process information received through a telephone line or the like and record it on a recording material (such as thermosensitive paper, ordinary paper or some other kinds of papers or sheet materials), and the other is to read information recorded on an original document and to transmit it to the receiving destination through a telephone line or the like. For this purpose, a system as schematically shown in FIG. 1 is used. In other words, it contains a power source 4 to supply electric power required for the operation of the apparatus, a network controller 5 to receive information from and transmit information to outside, a modem 6 to the demodulate information received and modulate information for transmission, a processor 1 to process information and output to each device controlling signals and information required for receiving or transmitting, an operational panel 7 to output processing instructions to the processor 1, a transmitting mechanism 2 to transfer the material on which information for transmission is recorded and read it through photoelectric conversion for output to the processor 1, and a receiving mechanism 3 to record on a recording material information received from the processor 1 by conveying the recording material on which such information is being recorded past a recording circuit. The processor 1 includes an input/output controlling circuit 11, a main controlling circuit 12, a binary conversion circuit for reading 13, and a decoding circuit 14. Transmitting mechanism 2 contains a reading circuit (for example, a CCD sensor) 21 and a carrier 22. The receiving mechanism 3 has a recording circuit (for example, a thermosensitive recording circuit) 31 and a carrier 32. Pulse motors are employed to drive the carriers 22 and 32 in the transmitting mechanism 2 and the receiving mechanism 3 respectively. In other words, the carrier 22 has a motor driver 41, a pulse motor 42, and a transfer mechanism and rollers 43. Likewise, the carrier 32 comprises a motor driver 51, a pulse motor 52, and a transfer mechanism and rollers 53. As shown in FIG. 2, when an original document 50 is placed in a tray 51 for transmission, the pulse motor 42 is actuated by an instruction from the processor 1. Then, carrier roller 52 is rotated by the driving force transferred through an arrangement of gears 61~64 and the carrier rollers 53, 54 which are connected with that roller by belts 59, 60 are rotated. The original document 50 are transferred one after another by the carrier rollers 52~54 and driven by rollers 55~57. In the process of transfer, the original 50 is irradiated by a lighting source 58 and its reflected light is received by the reading circuit 21 through a mirror 63 and lens 62. There information for transmission is photoelectrically converted. On the other hand, in the receiving process, the pulse motor 52 is driven by an instruction from the processor 1, and as shown in FIGS. 2 and 3, a platen roller 70 is rotated by an arrangement of gears 66~69. By this way, a recording material (in this example, a recording paper) 65 is transferred under pressure between the head of the thermosensitive circuit 31 and the platen roller 70. In the process of transfer, information is recorded by the head being driven in accordance with the information received from the processor 1. Also, a cutter 71 is actuated by an instruction from the processor to cut the recording material after the completion of the recording.

Next, the operations of transmission and receiving will be described in detail with reference to FIGS. 4 and 5.

Figure 4:
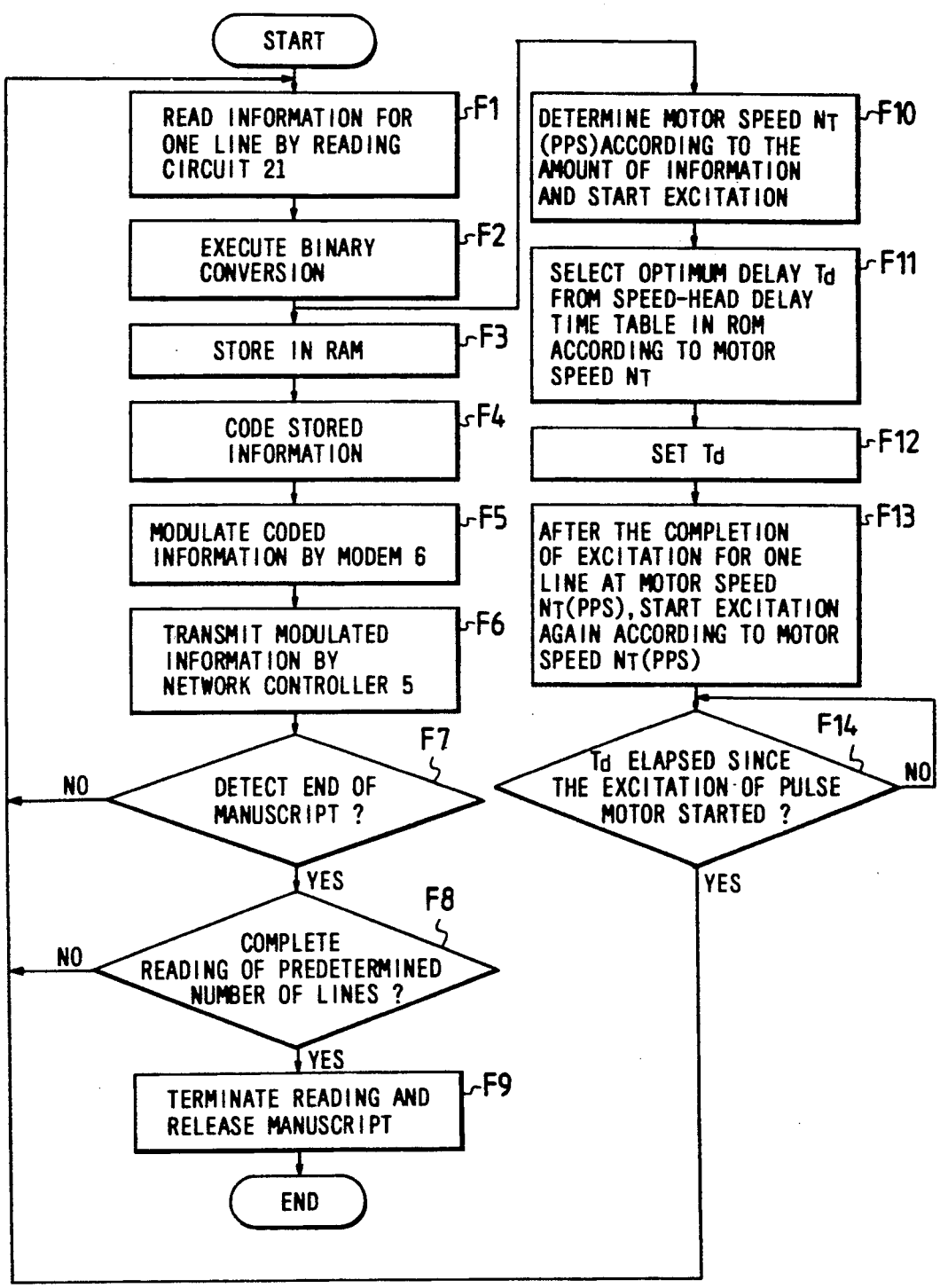
FIGS. 4 and 5 are operational flow charts of the embodiment shown in FIG. 1.
Figure 5:
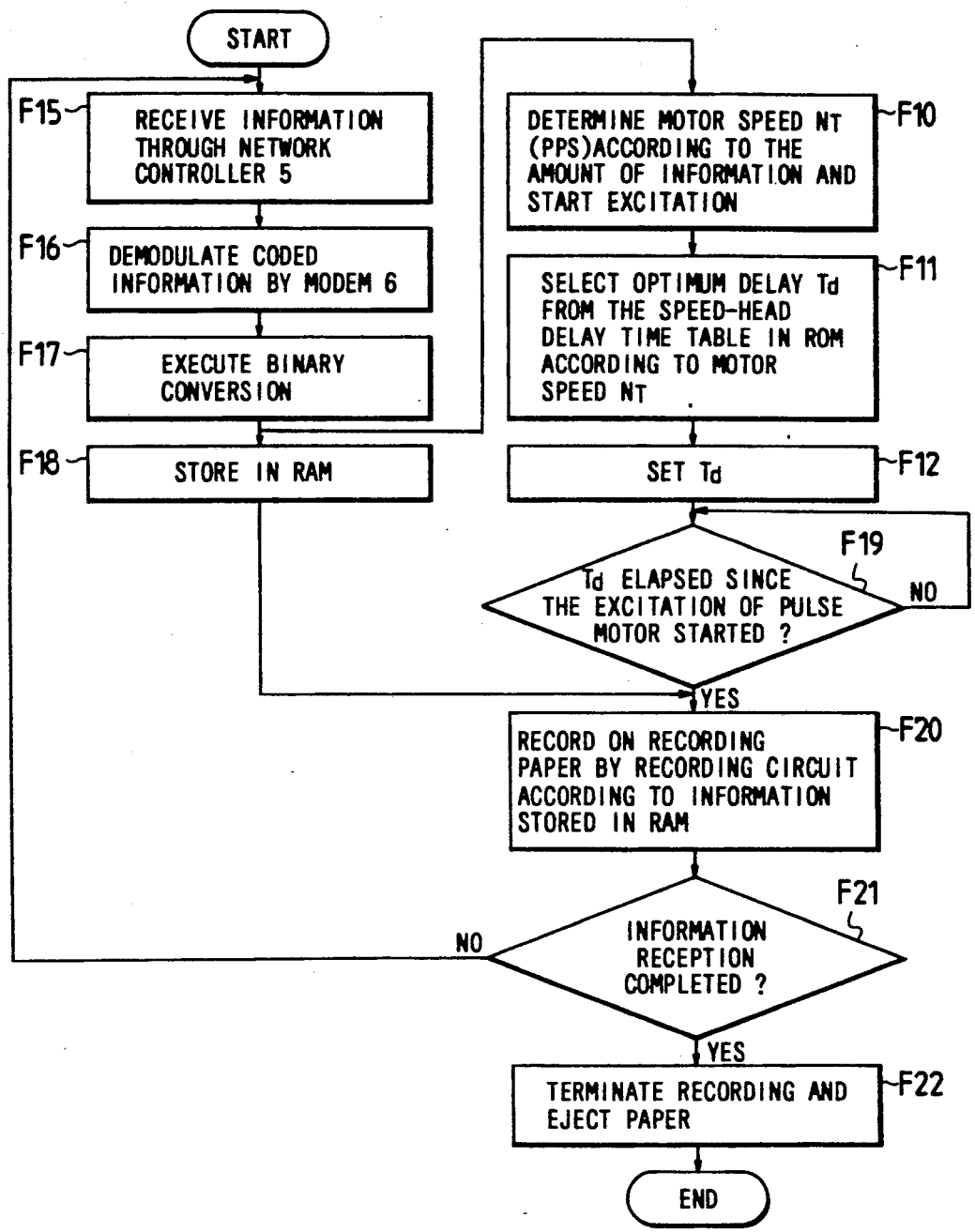

FIG. 4 is a flow chart showing the operation of transmission. When an original, namely a sheet on which information to be transmitted is recorded, is set and a starting instruction is issued to the processor 1 from the operation panel 7, the operation of transmission takes place. Now, in step F1, the processor 1 receives from the reading circuit 21 image signals for one line (usually 1/7.7 mm) photoelectrically converted by the sensor of the reading circuit 21 as an input to the processor 1. The image signals thus inputted (i.e. the ones having been read) are converted into binary by the circuit 13. This conversion process is shown as step F2. The image data converted into binary codes are stored in the random access memory (RAM) of the processor 1 (this process corresponds to step F3). The transmission is carried out by coding the stored image data which are modulated into transmittable information by the modem 6 for being transmitted by the network controller 5 to a receiving apparatus (a receiving side) through a transmission line (for example, a telephone line). The operations shown in steps F4~F6 correspond to this process. On the other hand, in accordance with the amount of information obtainable by converting image data into binary in step F2, the speed $N_T$(PPS) of the pulse motor 42 is determined. In other words, if the amount of information is smaller, the speed of the motor speed correspondingly $N_T$ is smaller, and to this speed thus determined, the motor driver 41 applies pulses of exciting voltage to each phase of the excitation coil. This process corresponds to step F10. Next, in step F11, in accordance with motor speed $N_T$ corresponding to the table of speed-head delay time which is stored in advance in the read only memory (ROM) of the processor 1, a head delay time $T_d$ for the given $N_T$ is selected. The table of speed-head delay time is arranged on the basis of each delay time between the starting times of the excitation signal correspond to the motor for each speed and the actual feeding of the original. Delay times are experimentally predetermined, and the delay time $T_{d1}$ is set for each speed $N_{Ti}$ (a positive integer of more than i=2) as data for the storage. When a $T_d$ is obtained from the table, the timer is set for such a value. Then, after a portion of time equivalent to the conveying of the first one line, the driving operation is started for the second and other lines at the same speed as the previous speed $N_T$ (step F13). Then, the moment the time $T_d$ passes after the excitation has taken place is calculated, and after the passage of such time, information on the second line is read. The same process is repeated thereafter until the end point of the manuscript is detected (step F7). This process continues until the reading is completed for all the number of lines (step F8). These processes in steps F10~F14 allow the timing of an transfer of an original to match with that of an information reading on each line of the original at each speed of the pulse motor 42. Thus, the reading can be carried out more accurately.

The above description describes the operations of transmission.

The operations of receiving will be described with reference to FIG. 5. The receiving operation takes place when the apparatus of a sender (the source of transmission) accesses the apparatus of a receiver. When this operation begins, the data being transmitted are received by the processor 1 as input through the network controller 5 and the modem 6, and an image recording is carried out. These processes are shown in steps F15~F17 of FIG. 5. The demodulated information is provisionally stored in a RAM. Next, in step F10, motor speed $N_T$ is determined using the demodulated image data, and the same processes as in the case of transmission (steps F11 and F12) are carried out. Then, based on the information stored in the RAM after the passage of time from the starting of excitation of the pulse motor to $T_d$, the recording is carried out by the recording circuit 31 on the recording paper (step F20). This series of processes continues until when there is no more information to be received, and is terminated at the end of receiving operation (refer to the processes in steps F21 and F22). Now, those processes in steps F10~F12, F19 and F20 allow the timing of the recording paper transfer to match with that of recording by the recording circuit 31 at each speed of the pulse motor 52. Thus, there are no resulting blanks between the overlapping so that a more accurate recording can be attained. Furthermore, the employment of this method permits the size of printing dots in the feeding direction of the recording paper to be as close as possible to the amount of feeding of each line. Thus, it becomes possible to make the size of the thermal head smaller to achieve a sharper image recording with better resolution.

Next, the excitation of the pulse motor, the movement of paper, and the timing relation between recording and reading in the above-mentioned embodiment will be described more precisely.

Figure 6:
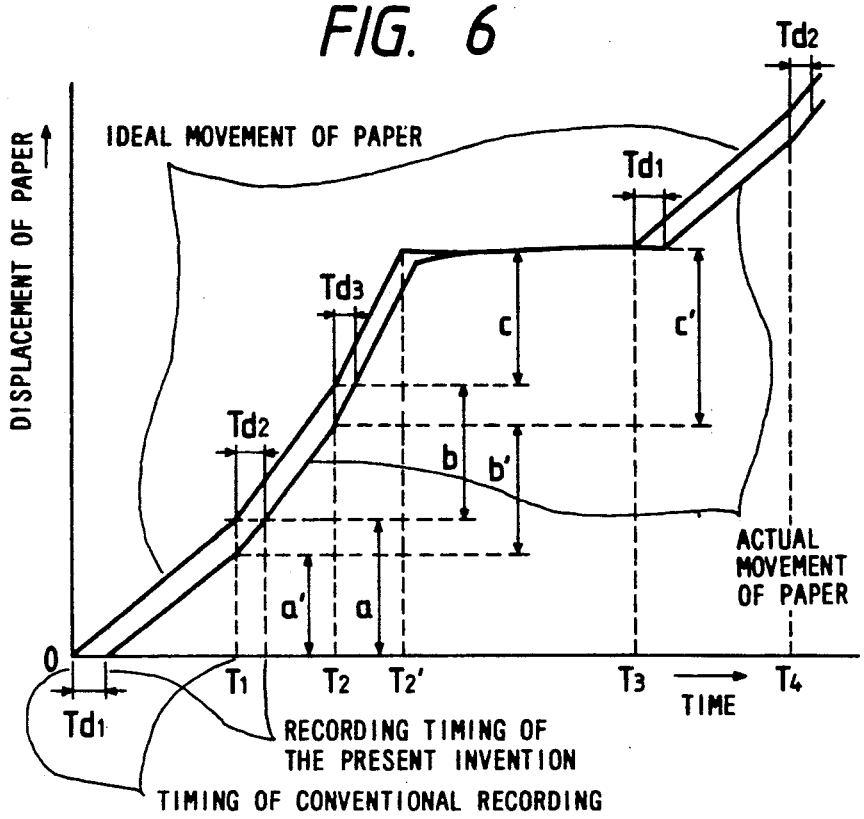
FIG. 6 is a diagram illustrating the movement of the paper in the embodiment shown in FIG. 1, FIGS. 7~9 are perspective views partly showing the recording unit.

FIG. 6 illustrates the relation between the displacement behavior of a recording paper and the timing of recording. The example shown in the figure represents the case where the paper is being transferred while three lines are printed, and the transfer and printing are again started after a short stop.

In FIG. 6, time-wise displacement of a recording paper is shown in the instances of an ideal displacement and the actual one. In this case a displacement of the means that an recording paper is started to move at the moment a motor is excited, and the transfer of an aimed one line portion is completed at the moment the excitation of the motor is terminated. In FIG. 6, the operation is started at the time 0 and at the time $T_1$, the transfer is at the displacement a. Then, at the time $T_2$ it is at the displacement b, and reaches the displacement c by the time $T_2'$. Then, it stops until the time $T_3$ when the transfer again takes place. In the ordinary facsimile apparatus, each of the amounts of displacement a, b, c corresponds to each space between the recording lines, resulting in a=b=c.

On the other hand, the actual transfer of a recording paper is such that there is a delay in an electrical action of the circuit in the motor driver 51 between the input of an excitation signal to the motor driven 51 and the actuation of the transfer of the excitation signal recording paper, another delay between the given to the pulse motor 52 and the starting of the actual revolution of the motor 52, and still some other delays in the transferring mechanism 53, all these delays together causing to generate a delayed action in the movement. These delays are the sum of a delay based on the electrical time constant and a mechanical delay by the spring constant and others in the mechanism.

According to FIG. 6, the above-mentioned movement is such that after an excitation signal is given to the motor driver 51 at the time 0, a recording paper starts to move after the passage of time $T_{d1}$, and at the time $T_1$ it is transferred to the displacement a' which is less than the target or ideal amount of displacement a, and then, transferred to reach the target displacement a after the passage of time $T_{d2}$. Therefore, the actual transfer of the paper shows its displacement with delays compared with the ideal ones, and when it reaches a position at the time $T_2$, it shows the delay $T_{d3}$. It is continuously transferred with a further delay, and reaches a target position during suspension. Then, at the time $T_3$, it arrives nearly at an ideal position. Thereafter, the same movement will be repeated.

With a recording paper showing a movement mentioned above, the space between lines becomes a', b', c', if the printing is carried out in the same timing as before, i.e., at the times 0, $T_1$, $T_2$, $T_3$, $T_4$ . . . , causing irregurality therebetween as compared with the ordinary space between the lines. In the case of FIG. 6, this relation becomes as follows:

$$\left.\begin{array}{l} a > a' \\ b \approx b' \\ c < c' \end{array}\right\} \quad (1)$$

If a recording is carried out in such a relation as shown in the expression (1) mentioned above, there appears an overlap on the lines recorded at the times 0 and $T_1$. The amount of the overlap at this juncture is a—a'. Also, likewise, there appears a blank on the lines recorded at the times $T_2$ and $T_3$. The amount of the blank at this juncture is the difference c'—c. However, with an appropriate delay being applied in the timing of recordings as shown in FIG. 1 and FIG. 5, the timings of recordings at 0, $T_1$, $T_2$, $T_3$, $T_4$ become $0+T_{d1}$, $T_1+T_{d2}$, $T_2+T_{d3}$, $T_3+T_{d1}$, $T_4+T_{d2}$ respectively. The spaces between lines at this juncture are a, b, c respectively, each resulting in an appropriate space between the lines. Therefore, there appears no overlap or blank, and a more accurate image recording with a regular contrast can be achieved. Furthermore, in the timing set up as shown in FIG. 6, the speeds at the times 0 and $T_3$ and those at the times $T_1$ and $T_4$ are equal. Therefore, the delay in each speed becomes equal at $T_{d1}$ and $T_{d2}$.

Although the selection of delay $T_d$ is carried out by referring to the speed-delay time table in the above-mentioned embodiment, the present invention is not limited to such a method.

For example, there may be the case where the effect is obtainable if only a delay $T_d$ is predetermined for a given value. In other words, in the case where there is not much difference in the delay $T_d$ in each speed, it suffices if only one $T_d$ is determined.

In the above-mentioned embodiment, it is readily seen from FIG. 2 that a roll of thermosensitive paper 65 is used as a reading paper. When such a recording paper as this is used, the diameter of the rolled recording paper 65 changes considerably as its remaining portion changes, causing the load to vary. Usually, if the load varies, the rising characteristic of a pulse motor is affected. In other words, with a greater load, the rising characteristic deteriorates more, and a longer time is required to reach a target position. Also, the delay in transferring a driving force in the transferring mechanism 53 from the pulse motor to the recording paper becomes greater. With these delays combined, the amount of the delay becomes large.

Figure 7:
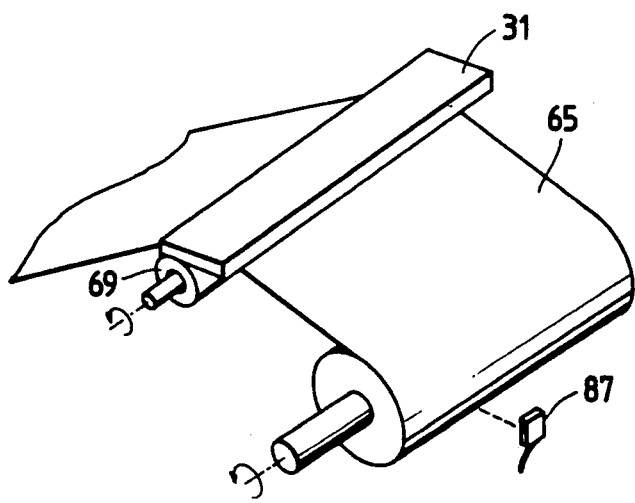

In order to compensate for such a delay as caused by a change in the diameter of the roll, the following measures can be taken. First, as shown in FIG. 7, a proximity sensor 87 is arranged in the direction of the thickness of the rolled recording paper 65 to measure the distance between the object to be measured, i.e., the recording paper 65 and the proximity sensor 87. Based on the data of the distance thus obtained, the diameter of the roll of the recording paper 65 can be determined. In other words, given the maximum radius of a roll $R_1$, its distance data $d_1$ and the minimum radius of a roll $R_2$, its distance data $d_2$, the radius of roll R at the time of its distance data d is obtainable by the following equation:

$$R = R_2 + (d_2 - d) \quad (2)$$

Figure 8:
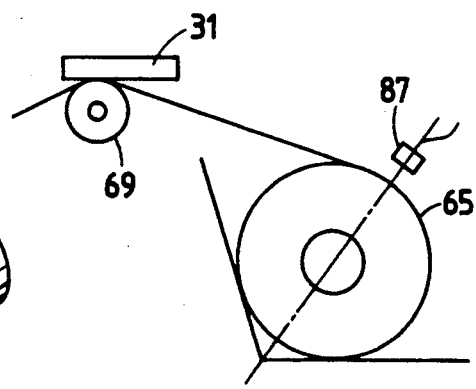

Now, in the above-mentioned embodiment, the axis of the rolled recording paper is rotatably fixed, and the description is made for such a case. If, however, the recording paper is placed inside a box or the like, the distance data changes its amount twice as much as the radius of a roll as it changes as shown in FIG. 8. Therefore, provided that the distance is d, the radius of a roll R is obtained by the following equation:

$$R = R_2 + \frac{(d_2 - d)}{2} \quad (3)$$

As set forth above, a proximity sensor capable of measuring distance is used to obtain the radius R of a roll. Some other methods are also applicable. For example, with a plurality of on-off sensors, each of which can only detect the availability of a recording paper, the radius of a roll can be obtained at each stage. FIG. 9 shows one of such examples. A plurality of the sensors are arranged in parallel with the axis of a recording paper 65 (In FIG. 9, four sensors 88~91). By the status of on or off of these sensors, the radius R of the roll is obtained at each stage. For example, in such a situation as shown in FIG. 9, the sensor 88 is off while sensors 89~91 are on. The radius R of the recording paper at this time is greater than the one at the position of the sensor 89 and is smaller than the one at the position 88.

Based on the radius data R of a recording paper thus obtained, a table of speeds $N_T$ (PPS) of a pulse motor and delay times $T_d$ for the radius R is produced. As an example, such a table as shown in FIG. 10 is provided in ROM. Here, for example, a delay time $T_{d32}$ is obtained at a speed $N_{T3}$ for a radius $R_2$. Using a delay time $T_d$ thus obtained, a recording is carried out in accordance with the flow chart shown in FIG. 5. Such a table as shown in FIG. 10 is arranged beforehand by an experiment or the like and is stored in the ROM. The delay times are obtained by computation. In other words, given $R_1$ for the maximum R and $T_{d1}$ for the optimum delay therefor, while $R_2$ for the minimum R and $T_{d2}$ for the optimum delay therefor, $T_d$ is obtained by the following equation:

$$T_d = \frac{R}{R_1} (T_{d1} + T_{d2}) + T_{d2} \quad (4)$$

This equation shows the case where the optimum $T_d$ changes almost proportionally to the radius. However, it is not limited to such a case as this. The operation depends on the structure of the transferring mechanism 53. Also, detecting a current value with, for example, a change in the load applied to a motor can be used in place of the measured value of the radius. In this way, an optimum delay $T_4$ can be determined in response to the change in the load applied along with the quantity of the remaining recording paper. As a result, a recording can be carried out at a proper position so as to prevent any deterioration of the quality of printing.

Next, another method of obtaining a delay in the timing of recording on a paper in such embodiments as shown in FIGS. 1~5 will be described. FIG. 12a is a diagram showing the relations between the movements of a paper and the timings of recording. In the first line, four blocks $D_{11} \sim D_{14}$ per line are recorded by time-division as shown in (FIG. 12c) by $A_1$ of the starting timing of recording (FIG. 12b). Likewise, in the second line, $A_2$ is the starting timing of recording and $D_{21} \sim D_{24}$ are the timings of each block. Therefore, the same is applicable to the third line.

Here, the starting timings of recording applied are the actual timings of the recording paper at given line positions, i.e., $A_1$ at $T_o'$, $A_2$ at $T_1'$ and $A_3$ at $T_2'$. The setting up method of the timing (FIG. 12c) of printing for each block will subsequently be described. The transfer of the paper at the time of recording is not constant because its speed changes for each line. Therefore, the timing (FIG. 12c) is obtained with the speed $N_T$ (PPS) of each line as a base. First, the time at which the transfer of one line is completed is obtained by the speed $N_T$ (PPS). Usually, in a pulse motor, it is obtainable by the period of time during which a pulse is excited for a given line. In FIG. 12, since the usual pulse timing is delayed by $T_d$, the time required for the transfer of first line becomes $T_1' - T_0'$, second line, $T_{1s}' - T_1'$, and third line, $T_3' - T_2'$. In this embodiment, the time required for the transfer is divided into five parts to set up block timings. In other words, it is obtained by the following equations:

$$D_{11} = A_1 = T_0'$$

$$D_{12} = T_0' + \frac{1}{5}(T_1' - T_0')$$

$$D_{13} = T_0' + \frac{2}{5}(T_1' - T_0')$$

$$D_{14} = T_0' + \frac{3}{5}(T_1' - T_0')$$

(5)

$$D_{21} = T_1'$$

$$D_{22} = T_1' + \frac{1}{5}(T_{1s}' - T_1')$$

$$D_{23} = T_1' + \frac{2}{5}(T_{1s}' - T_1')$$

$$D_{24} = T_1' + \frac{3}{5}(T_{1s}' - T_1')$$

(6)

$$D_{31} = T_2'$$

$$D_{32} = T_2' + \frac{1}{5}(T_3' - T_2')$$

$$D_{33} = T_2' + \frac{2}{5}(T_3' - T_2')$$

$$D_{34} = T_2' + \frac{3}{5}(T_3' - T_2')$$

(7)

Likewise, the timing of printing for each block is set up in the same manner as mentioned above.

Next, another embodiment of the present invention will be described. As shown in FIG. 6, the movement of the recording paper 65 of a facsimile apparatus or the like is such that the actual transfer of the paper is delayed against the timing of the excitation of a pulse motor. This relation will be described with reference to FIG. 11. There, the excitation signal is given to a pulse motor at the time $T_0$ but the actual displacement of the recording paper takes place after the passage of delay $T_{d1}$. Subsequently, even if the speed is changed at the time $T_1$ after a given one line has been transferred, the time at which the recording paper passes a given position is $T_{d2}$ after $T_1$. Likewise, the recording paper reaches the position at the time $T_2$ with a delay $T_{d3}$.

After that, even if the excitation signal is again given to start at the time $T_3$ after a given period of suspension, the actual displacement of the recording paper takes place with a delay $T_{d4}$. In other words, the expected movement of the paper should be as shown in a solid line in FIG. 11. Actually, however, it moves with a delay as shown by a chain line therein. Therefore, in this embodiment, prior to the normal timing of excitation for a pulse motor, an excitation is arranged to take place so that the actual movement of the paper can match with the timing of the excitation signal. In other words, an excitation is given earlier than the time $T_0$ by the period of time $T_{d1}$, likewise, the speed is arranged to change at $T_{d2}$ in order to given an excitation signal earlier than the time $T_1$ that much, at the time $T_2$, an excitation signal is given earlier by $T_{d3}$, and at the time $T_3$, it is given earlier by $T_{d4}$. With such arrangements of the timings as these, excitation signals are given so that the movement of the paper should be as shown in the figure. Actually, however, it moves as shown by the solid line therein. This means that the movement of the paper can be synchronized with the normal timing of excitation by arranging the timing of the intended excitation earlier than the actual time. Thus, the results of recordings each printed at the times $T_0$, $T_1$, $T_2$, $T_3$, gain proper spaces between the lines so that there are no blanks or any other drawbacks that may cause the quality of recordings to be deteriorated. For the times $T_{d1} \sim T_{d4}$ for earlier excitations in this embodiment, the delay $T_4$ previously described is applicable, and the method of its selection is also made in the same manner as previously described.

Next, still another embodiment of the present invention will be described. FIG. 13 illustrates an example in which an encoder 92 is arranged as a detector to detect the number of revolution of a platen roller in an apparatus for producing facsimiles. FIG. 14 is a diagram showing an example in which the pulse timings of the encoder 92 are represented in relation to the displacements of the recording paper 65 in such a construction as shown in FIG. 13. In this example, the operation is carried out in the way that after three lines have been recorded, the recording is suspended for a while before it is again started and that each space between lies has a constant value a.

Figure 14A:
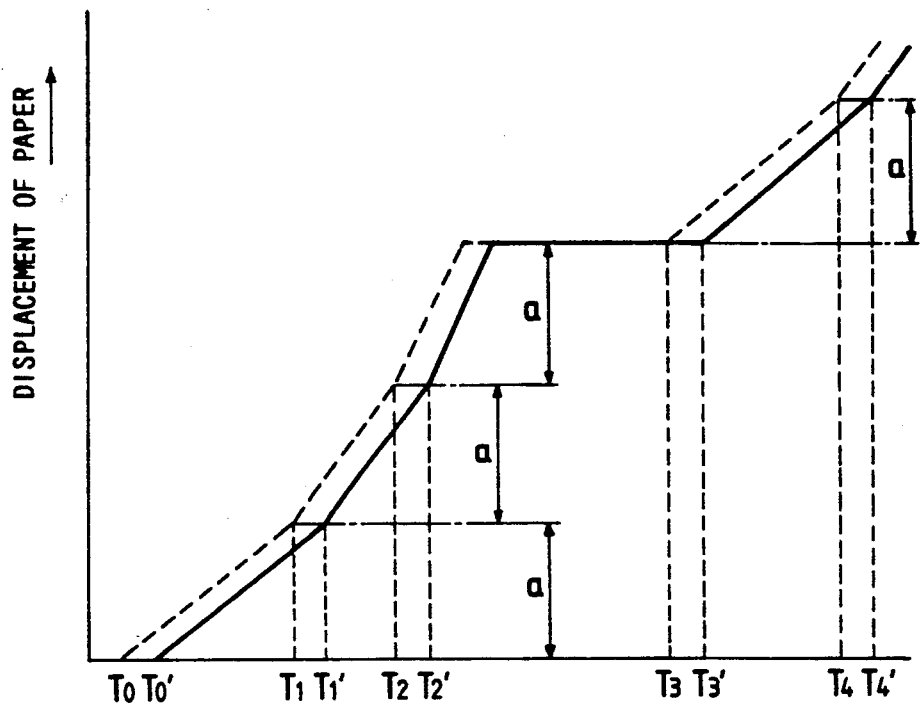
Figure 14B:
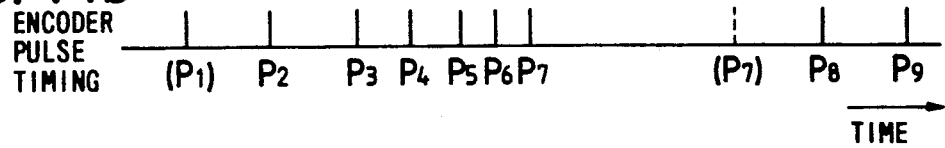

In FIG. 14a, excitation signals are given each at the time $T_0$, $T_1$, $T_2$, $T_3$, $T_4$ to start the transfer of a recording paper with each timing from each line position to the next one. However, the actual movement of the recording paper is such that the above-mentioned transfer takes place each at the $T_0'$, $T_1'$, $T_2'$, $T_3'$, $T_4'$ because of the delays occurring in the motor driver 51, the transferring mechanism 53 and others. On the other hand, if an encoder 92, which generates 2 pulses during the transfer of one line, is used to adjust the pulse timing to match with the printing time, the output of pulse timing from the encoder 92 represents such timings as shown in FIG. 14a. In other words, the pulse timing of the encorder can be utilized as printing time of each line. This means that at the time $T_0'$, $P_1$ is applicable, likewise, at $T_1'$, $P_3$, at $T_2'$, $P_5$, at $T_3'$, $P_7$, and at $T_4'$, $P_9$. While the recording paper is stopped for a while, each pulse $P_1$, $P_7$ has already been issued at the time $T_0'$, $T_3'$. Therefore, they are mentioned in parentheses. Consequently, if the timings of printing by the recording head 31 are set each at the time $P_1$, $P_3$, $P_5$, $P_7$, $P_9$, a proper line space can be maintained respectively, making it possible to carry out each printing at an accurate position. Here, the pulse at $P_7$ has already been issued after the suspension of the transfer of the previous line. In order to assure accuracy, therefore, the timing, which is obtainable by a given pulse signal of the encoder to be issued after a pulse signal has been generated by the excitation of a motor, can be applied as a recording timing. With this method, the timings with which the recording of printing are carried out become the times $T_0$, $T_1'$, $T_2'$, $T_3'$, $T_4'$, allowing each line space to be equal to a given line space a. In other words, the amount of transfer of the recording paper from the time $T_0$ to $T_1'$, becomes a, and likewise, the amount of the transfer of each from the time $T_1'$ to $T_2'$, $T_2'$ to $T_3$, and $T_3$ to $T_4'$ becomes all a, allowing it to match with a proper line space respectively.

Figure 15:
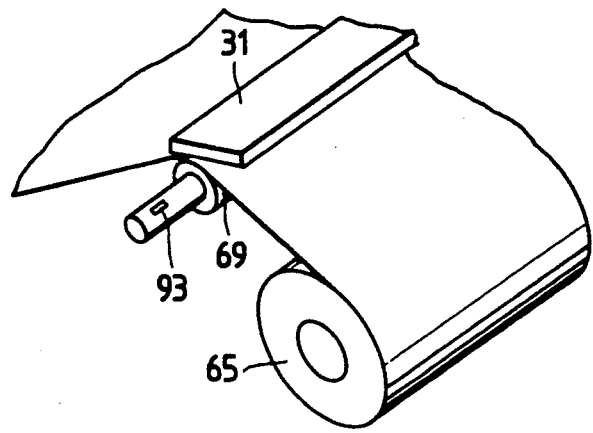

Next, still another embodiment of the present invention will be described. FIG. 15 shows an example in which a pick up sensor 93 is arranged to detect the rotation of the roller of the platen roller for recording in a facsimile apparatus. For this purpose of detection, those sensors available for detecting acceleration or strain displacement and others can be used.

Figure 16:
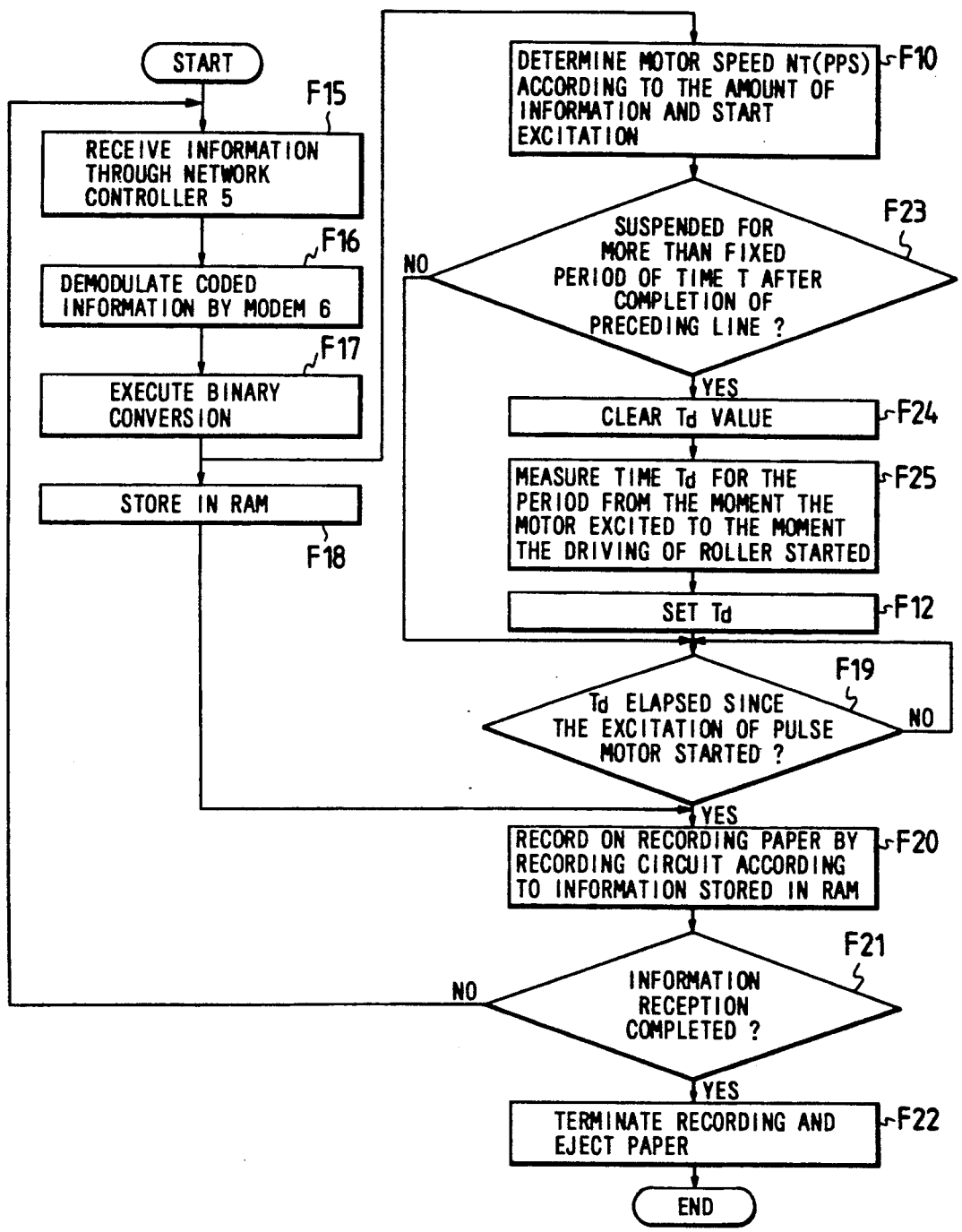
FIG. 16 is an operational flow chart illustrating another embodiment of the present invention.

FIG. 16 is a flow chart showing the operation of a body having such elements shown in FIG. 15. In FIG. 16, steps F10, F12, and F15~F22 are the same as those shown in FIG. 5 respectively. Among the operations of this embodiment, the description of any of those which are the same as the ones already explained in FIG. 5 is omitted. The operations genuine to this embodiment will subsequently be described. In this embodiment, a pulse motor determines whether or not it stops itself for more than a given period T of time after each line has been transferred when its printing is over. This operation is carried out at step F23. If the motor is at rest, the delay $T_d$ previously set up is first cleared. Then, a period of time required to actuate the platen roller 69 after the starting time of the excitation of the motor at rest, i.e., the time $T_d$ required before the movement of the recording paper takes place is measured. This period of time required is detected by the pick up sensor 93. After the measurement thereof, the new delay time $T_d$ is set in RAM. Thereafter, each recording is carried out after the passage of $T_d$. This series of operations is shown in steps F23~F25 and F12, F19, and F20. On the other hand, if there is no suspension period for more than a given period T, the delay $T_d$ which has previously been set up is still applicable. In this embodiment, although the suspension period T to be determined in step F23 varies by the different kinds of apparatus, it is known to produce a greater effect when it is set at approximately 1 ms according to the result of our experiments.

In accordance with this embodiment, the setting up of the delay $T_d$ can be carried out with a comparatively simple structure. Also, $T_d$ can be set up according to the condition under which the 1st line of the recording paper is transferred, making it possible to take a proper step against any change in the delay $T_d$ caused by an aging of the transferring mechanism and such environment changes as temperature, moisture and others. As a result, any deterioration of printing quality that may be caused by the occurrence of blank in recording prints and other drawbacks can be prevented.

Figure 17:
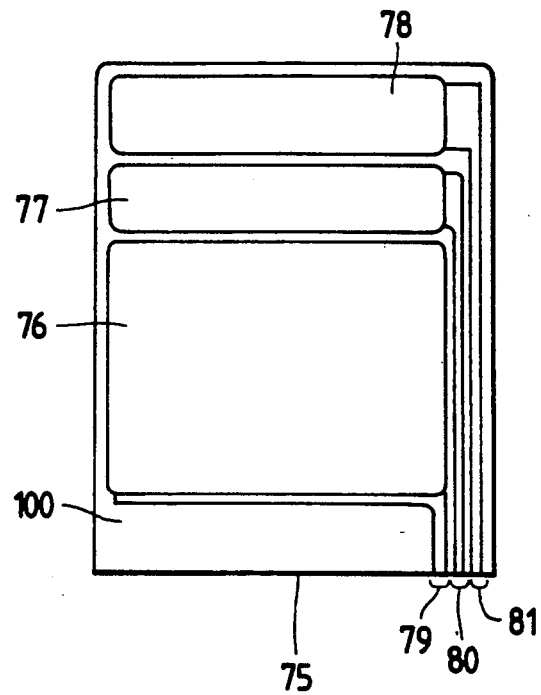
FIGS. 17 and 18 are views illustrating a structure of thermal recording heads.

Next, still another embodiment of the present invention will be described. As shown in FIG. 6, when a delay takes place in the movement of a recording paper, deviation from a proper line space results. In such a case, the size of printing dots of a thermosensitive head in the recording circuit 31 is altered according to the width of line space. In other words, as shown in FIG. 17, a heat generating resistive body is divided into three parts on a base 100 in the thermal head 75 which forms one dot. The resistive member 76 is connected to a driver (not shown) through a lead line 79 while resistive members 77, 78 are connected to a driver (not shown) through lead lines 80 and 81. The resistive body functions in such a manner that when, in the recording circuit 31, a voltage is applied to the resistive member 76 through the lead line 79, heat is generated so that the potion of a thermosensitive recording paper, which is in contact with the resistive member, is caused to develop colors because of sensing the heat. Likewise, when a voltage is applied to the resistive members 77 and 78 through the lead lines 80 and 81, they are heated so as to cause the recording paper to develop colors. Therefore, with a voltage being applied only to the resistive member 76, the coloring of the printing dot on the recording paper is the smallest in size, with a voltage being applied both to the resistive member 76 and 77 simultaneously, the size of the printing dot is small, and with a voltage being applied to all the resistive members 76, 77, and 78 simultaneously, the size of the printing dot becomes the largest. With this thermosensitive head 75 in FIG. 6, only the resistive member 76 is heated for coloring by the timing $T_1$ at the time 0, and at time $T_2$, two of the resistive members 76 and 77 are simultaneously heated for coloring, and at the time $T_3$, all three resistive members 76, 77, and 78 are simultaneously heated for coloring. According to this embodiment, therefore, the size of printing dot can be made larger if the line space becomes wider so as to prevent any deterioration of the printing quality caused by the occurrence of blank and other drawbacks.

Figure 18:
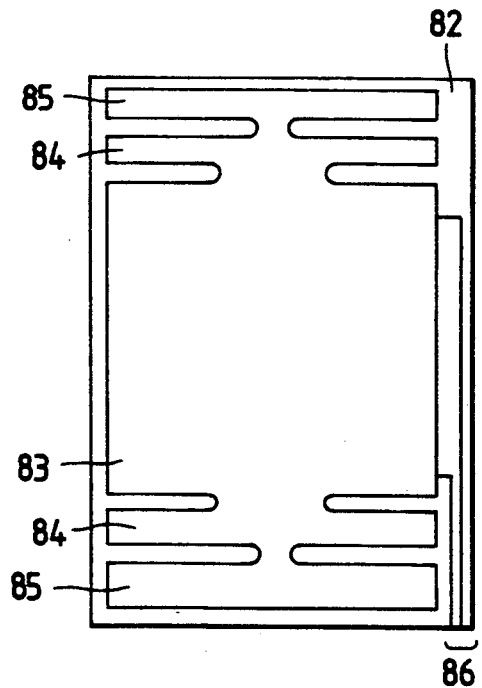

Furthermore, although an example is shown in FIG. 17 in which one thermosensitive recording head has a plurality of resistive members so that a different combination of members, when a voltage is applied, results in a change in the size of printing dot, the size of printing head can still be changeable with only one resistive member if the value of the voltage is altered or with a constant value of the voltage if the period of its application is altered. The same effect can be obtained in this way. By way of an example, a thermal head 82 is shown in FIG. 18, which forms only one dot with the resistive portions 83, 84, and 85 connected by the narrow portion at its center. In this head, the resistive portion 83 is first heated by a driver (not shown) through a lead 86, and as an applied voltage is intensified or the application period of its voltage is prolonged, the resistive portions 84 and 85 are heated. With such a control as this, the size of printing dot is changed to develop colors on a recording paper so that the same effects as in the aforementioned embodiment can be obtained.

As set forth above, according to the present invention, the positions of the recording paper and recording head or the manuscript and reading sensor at each line can be matched, or can be closely matched, so that drawbacks in image recording and reading can be diminished. Also, according to the present invention, it becomes possible to achieve a high-quality image recording and an extremely accurate image reading.

We claim:

1. A method of image reading an original by a sensing member of a reading circuit, said original being transferred relative to said sensing member by a motor, comprising the steps of: delaying a start of reading said original by said sensing member by a delay period between when an output signal to drive said motor is received by said motor and when the motor is actually started and reading information recorded on said original by said sensing member.

2. A method of image recording in which a recording material and a recording head are disposed in contact with each other or closely in a vicinity to each other, said recording material being transferred relative to said recording head by a motor, the method comprising the step of generating a driving signal from input means to be received by a recording circuit after an output signal to drive said motor by a given period of time corresponding to a delay of a start of said motor.

3. An apparatus for image recording comprising a motor to transfer a recording material, a power transmission system for transmitting a driving force of said motor to transfer said recording material, a recording circuit for recording image data on said recording material, a controlling means for receiving said image data and generating a first driving signal in order to record said image data by said recording circuit and generating a second driving signal to drive said motor, said controlling means generating said first driving signal after a given time period of delay corresponding to a delay time period between when said second drive signal is generated and a starting of the transfer of said recording material.

4. An apparatus for image reading comprising: a motor for transferring an original, a power transmission system to transmit a driving force of said motor to transfer said original, a reading circuit for reading said original, and means for controlling said reading circuit to process information read by said reading circuit, by a first start signal and to drive said motor by a second starting signal, wherein said controlling means controls said reading circuit by delaying said first start signal for a given period of time corresponding to a time period from when the second starting signal is received by said motor until said original is transferred by said motor.

5. An apparatus for image reading comprising a reading circuit to read information recorded on a original, a motor to generate a driving force to transfer said original relative to a sensing device of said reading circuit, and controlling means to generate a driving signal received by said motor and to receive input information from said reading circuit, said information being read by said reading circuit after a given period of time and between a time period when said motor actually is started and when said drive signal is received by said motor.

* * * * *